United States Patent [19]

Zdunek et al.

[11] Patent Number: 4,646,345

[45] Date of Patent: Feb. 24, 1987

[54] AUTOMATIC UNIT ID FOR QUASI-TRANSMISSION TRUNKED SYSTEMS

[75] Inventors: Kenneth J. Zdunek, Schaumburg; Bruce D. Heyman, Algonquin; Michael D. Sasuta, Palatine, all of Ill.

[73] Assignee: Motorola, Inc., Schaumburg, Ill.

[21] Appl. No.: 872,360

[22] Filed: Jun. 9, 1986

[51] Int. Cl.[4] ............................................. H04Q 7/04
[52] U.S. Cl. ........................................ 379/62; 379/58; 455/38
[58] Field of Search ................. 179/2 E, 2 EA, 2 EB, 179/2 EC; 455/33, 38, 26

[56] References Cited

U.S. PATENT DOCUMENTS

| | | | |
|---|---|---|---|
| 4,411,017 | 10/1983 | Talbot | 455/26 |
| 4,538,029 | 8/1985 | Gazzoli et al. | 179/2 EA |
| 4,560,832 | 12/1985 | Bono et al. | 179/2 EA |
| 4,574,163 | 3/1986 | Zato | 179/2 EA |

Primary Examiner—Robert G. Lev
Attorney, Agent, or Firm—Margaret Marsh Parker; James W. Gillman

[57] ABSTRACT

The system requires the use of the permanent ID of the requesting unit in every channel request made on a control channel before every transmission. The channel grant will include the ID along with the channel number and these may be recorded for possible later reference. A channel assignment is retained for a brief period after each transmission, allowing a conversation to be continued on the same channel without a break. Units can access the control channel with a channel request and be assigned a channel even while the dispatcher is using the voice channel. In the case of a need for communication with a larger group, a dispatcher can form a temporary "patch" group of all involved units, with a temporary ID assigned to that group. A channel request from a member of the larger group must then include, not only the permanent ID of the requesting unit, but the temporary ID of the "patch" group.

11 Claims, 7 Drawing Figures

AUTOMATIC UNIT ID FOR QUASI-TRANSMISSION TRUNKED SYSTEMS

BACKGROUND OF THE INVENTION

This invention relates to the field of trunked communications systems having a base station and a multiplicity of remote units and, more particularly, to a means for providing positive identification of every unit using the system.

Trunked communication systems are systems wherein a multiplicity of units or subscribers have access to the same group of channels as needed. Telephone systems are an example of trunked systems and so are most two-way radio communication systems where the number of available channels is limited, full-time use of a channel would be more costly, and no one user needs full-time access to a channel. Trunked systems have often been termed either "message trunked" systems or "transmission trunked" systems. In both of these types, a dual control channel is used along with a number of voice channels. Each mobile unit has a unique identification code (ID) which includes its own individual code and its permanent group code. Using the control channel and its complete ID code, the mobile unit requests the use of a voice channel and, if a channel is available, a "channel grant" is given via the control channel. The mobile unit then switches to the assigned voice channel and communicates as desired.

In message trunking a timer in the control unit provides a time-out-time (TOT) of perhaps five or six seconds, during which the message or conversation can be continued on that same channel by again depressing the PTT. When the original mobile unit "dekeys" or releases the PTT, the channel remains available during the TOT period during which that unit or another unit can transmit on that channel without requesting it via the control channel. Thus, a situation is created whereby an unidentified unit could be using a voice channel if the channel was accessed soon after an identified transmission ended. Also, the five or six seconds of unused channel time was a significant, inefficient use of the channel.

In public safety operations (police, fire, etc.) it is highly desirable to have each transmitting unit identified, both in real time, and by recording of all voice channels for later identification of "who said what, and when". "Transmission trunking" is one solution to the identification problem. In transmission trunked systems there is no time-out-time and a request to transmit (including an ID) must be sent on the control channel before any mobile unit can access a voice channel. This arrangement solves the problem of unidentified units and is more efficient of channel time, but is not practical when used with systems including so-called wireline control consoles; i.e., systems wherein a dispatcher has a console with direct coupling between his microphone/speaker and the transmitter/receiver, respectively, of the assigned voice channel repeater. The difficulty arises from the fact that the dispatcher has priority while talking and the mobile units are required to listen while he is transmitting. In other words, the mobiles could not access the control channel, and thus could not use the voice channels, until the dispatcher dekeyed. Also, no other mobile unit can use that channel until the first unit has completed its conversation or data transmission and has released the push-to-talk button (PTT).

Another approach which has evolved, termed "quasi-transmission trunking", provides for a very short (0.5 to 1.0 sec) TOT during which a channel remains assigned, reducing the wasted channel time considerably but still allowing any unidentified unit to access the assigned channel during the TOT.

A typical trunked "system" may consist of a large number of mobile units comprising several "fleets". In public safety applications, one fleet might be a police department or a portion thereof, another fleet might be a fire department while other fleets might be mobile medical units, etc. Within a fleet there would be working groups or "subfleets" such as the mobile units of one police district. It is apparent, then, that a subfleet would mostly communicate within its own group, but could also need to communicate with another subfleet, even from another fleet. For example, at a large fire, a fire department subfleet would need communication, not only with other groups of firemen within its fleet, but also with the police units at the scene. The dispatcher must have the capability of communicating with whatever group or groups are necessary in a given situation. Such communications between different groups or "subfleets" in a trunked system may be termed temporary console "patches" in analogy to the former use of "patch cords" on telephone switchboards or "dynamic regrouping". This capability has been disclosed in a co-pending patent application, Ser. No. 770037. In the case of such regroupings or "patches", however, it is still important to be able to identify each unit which transmits.

SUMMARY OF THE INVENTION

It is, therefore, an object of this invention to provide for identification of every unit and group transmitting on a channel in a trunked system.

It is a further object to provide access to a voice channel even when a dispatcher is transmitting.

It is a more particular object to provide the same identification capability while combining groups within the system.

It is another object to provide for improved channel time efficiency over many previous systems.

These objects and others are provided in a system including the present invention wherein each unit in a trunked system has a unique ID code and must use that ID on a control channel to request a voice channel before being enabled to transmit. At the end of each transmission the channel is reserved for a very brief period during which the original requester or any other unit wishing to continue the conversation must go to the control channel with a new request but, during the timed period, would be guaranteed re-access to the same channel. After the timed period expires, a channel request would be honored by assignment to any unbusy channel, and all units involved in the conversation would be directed to switch to that channel. When the unit has been assigned temporarily to a larger group, and a unit wishes to transmit, a channel request is made using a two-word ID made up of the unit's permanent ID and the temporarily-assigned ID of the new group. Thus the identity of each transmitting unit is still a matter of record. This improvement to the system may be termed "wireline unit ID processing" or "PTT-ID processing".

DETAILED DESCRIPTION OF THE PREFERRED EMBODIMENT

Figure 1:
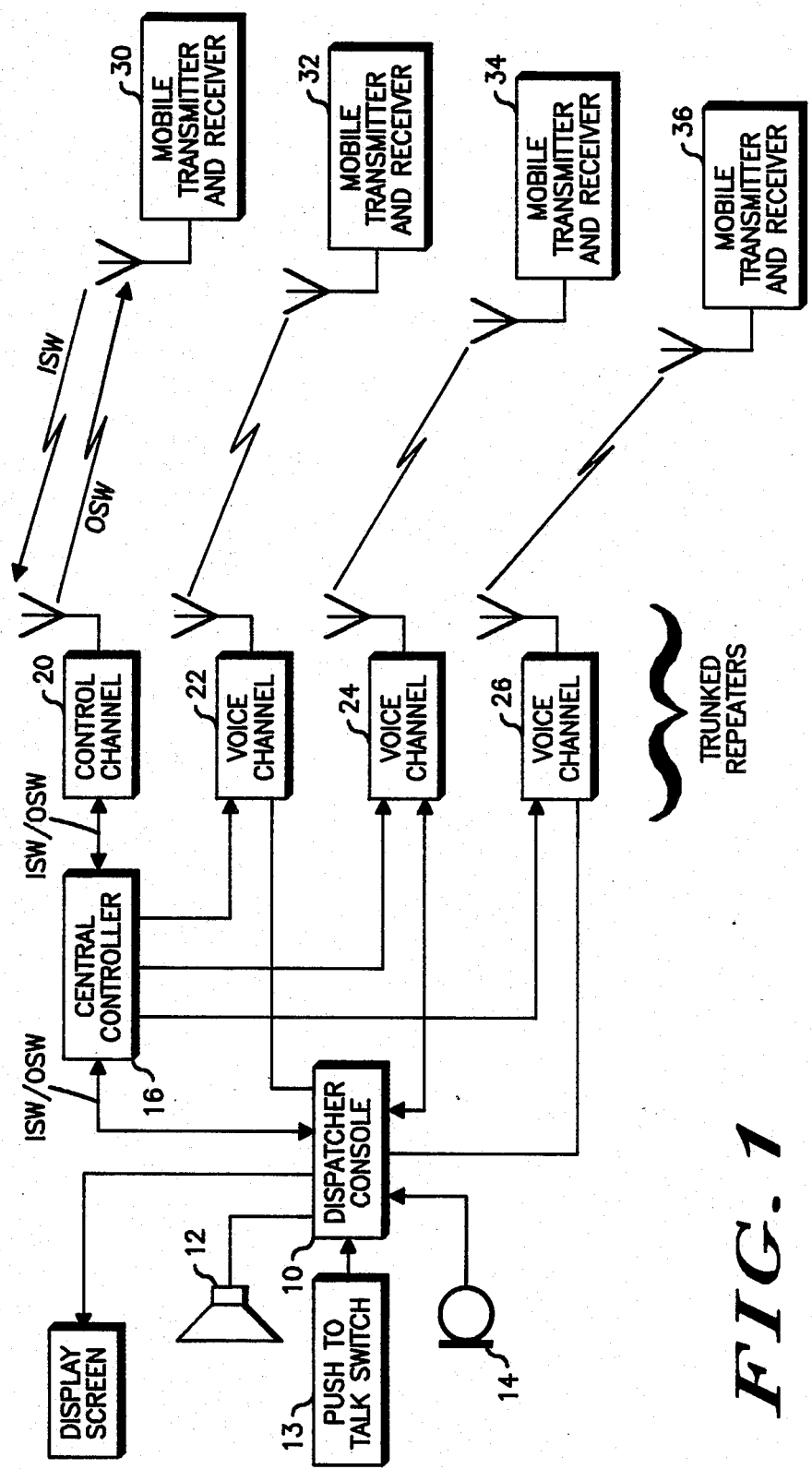
FIG. 1 is a block diagram of a typical communications system such as could use the present invention.

FIG. 1 illustrates in broad terms a two-way trunked communications system such as could use the present invention. This is a system as typically used in public safety applications; i.e., police, fire, etc. A dispatcher operates a console 10 having a speaker 12, PTT switch 13, a microphone 14 and a display screen 15. It is in the nature of public safety work that the dispatcher will be communicating outbound via his microphone on an almost continuous basis while receiving inbound calls via his speaker and via telephone lines (not shown). It is this constant and direct or "wireline" use of voice communication by the dispatcher which in previous systems has blocked easy access to the system, as will be seen hereinafter. The dispatcher console 10 is coupled directly, typically by a wired connection to a central controller 16. The controller 16 is coupled to a plurality of repeaters including one control channel repeater 20 which is utilized by all units within the system for requesting and granting of voice channel assignments. The control channel repeater 20 is preferably a dual channel unit so that simultaneous reception and transmission can take place. All other repeaters 22, 24, 26 (representing a large number of units) are utilized for voice communication between a plurality of mobile units 30, 32, 34, 36 (representing a much larger number of units) and between the mobile units and the dispatcher.

As is well known in the prior art, channel requests are initiated by depression of a push-to-talk button (PTT) (not shown) on the requesting unit and made automatically by the logic within the unit. A channel request, termed an ISW (inbound signaling word), will include the ID of the requesting unit as well as other pertinent information such as the ID of the destination unit or group. The channel grant, termed an OSW (outbound signaling word), will also include the ID's of the requesting unit and the destination unit or group, the number of the assigned channel and other necessary data. Upon reception and decoding of the OSW, all units involved will switch automatically to the assigned voice channel.

At the dispatcher's console, the identity of the requesting unit is preferably automatically logged and can also be displayed on the dispatcher's display screen 15. A recording is made of all voice communications as well and, when necessary, a spoken message could be matched with the log to identify a particular speaker. The assigned channel number is registered as well as the ID's of all units which initiate calls. Through the record it can also be determined which groups of units were involved in a particular conversation, although it cannot be determined if a particular unit was actually listening unless the unit transmitted.

Figure 2:
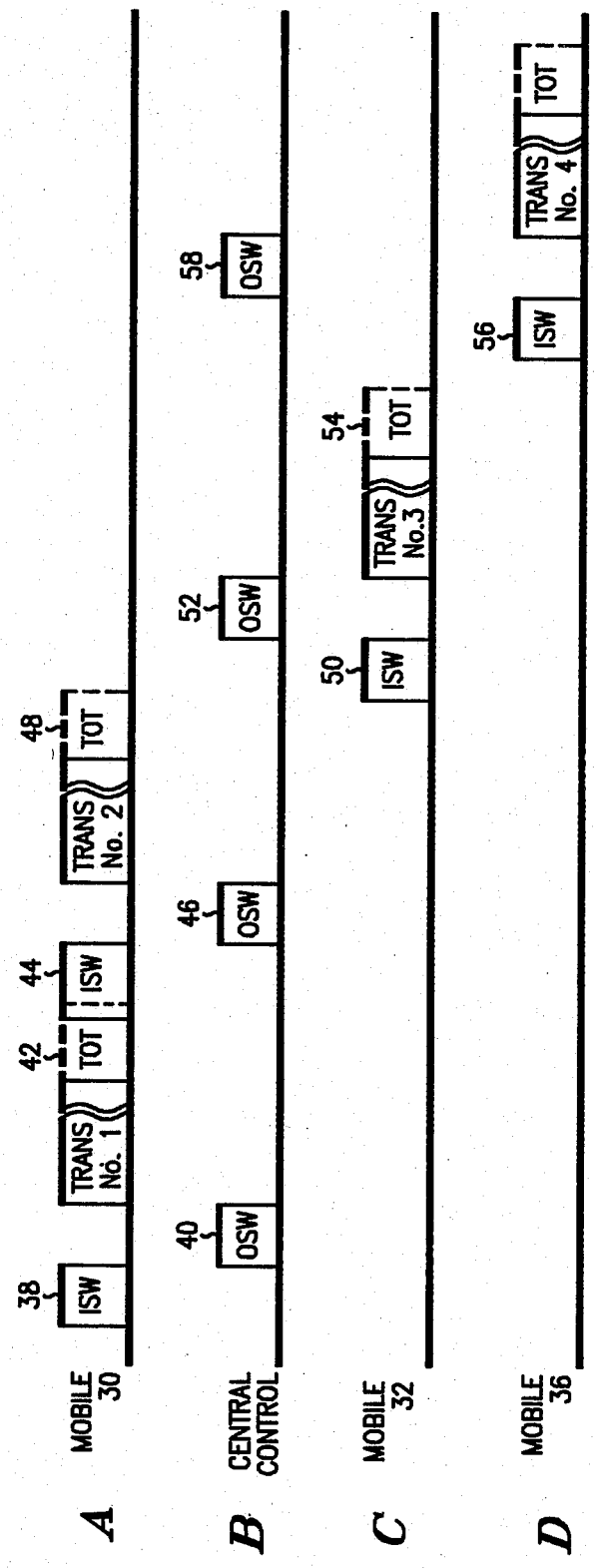
FIG. 2 is a timing chart illustrating the functioning of the system of FIG. 1.

FIG. 2 is a timing chart illustrating the functioning of the system of FIG. 1. No attempt should be made to scale this chart. With respect to FIG. 2, it is assumed that the operator of the mobile unit 30 needs to call for help from the operators of mobile units 32, 34 and 36 who may or may not be located nearby. The operator of mobile unit 30 will choose the particular group with which he needs to communicate, depress his push-to-talk button (PTT) and an ISW 38 will be transmitted automatically on the control channel as shown in FIG. 2, line A, including the ID's of his unit and the unit or group of units with whom he needs to communicate. The means of selecting another group or subfleet may be a selector switch on the panel of his unit. A call to another individual mobile unit may be selected using a push button panel similar to that of a telephone. The central controller will record the ISW information and, if there is an unbusy channel, will transmit a channel grant in the form of an outbound signaling word (OSW) 40 as seen in line B. An OSW may be transmitted periodically as will be discussed hereinbelow. Upon receiving and decoding the OSW 40, mobile unit 30 will automatically switch to the assigned voice channel and begin transmitting via repeater 22. Meanwhile, units 32, 34 and 36 have also received and decoded the OSW 40 on the control channel and have automatically switched to the same voice channel, but in the listening mode.

At the end of the transmission #1, the operator of mobile unit 30 will release his PTT and stop transmitting. A time-out-timer (TOT) in the central controller 16, however, will initiate a brief timing period of, for example, 0.5 to 1.0 seconds during which the voice channel of repeater 22 will be reserved for the use of the mobile units which had been using it. This timing period is indicated by a dashed line following the transmission #1 and designated as TOT 42. If the operator of mobile unit 30 depresses his PTT again within the TOT 42, an ISW 44 will be sent on the control channel and an OSW 46 will be sent back, but the same channel as before will be assigned, and units 32, 34 and 36 will remain on that channel.

Figure 3:
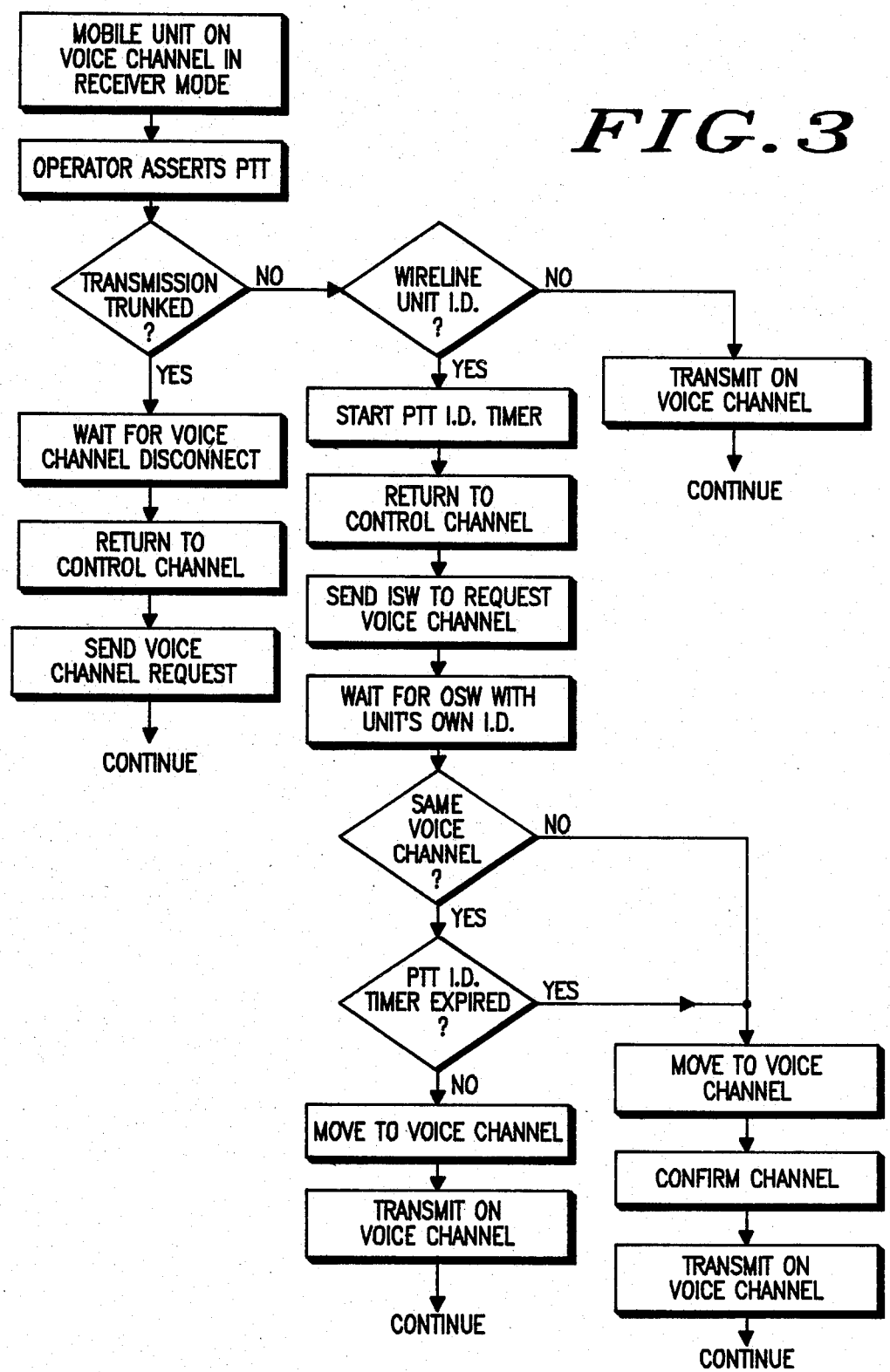
FIG. 3 is a flow chart of the control operation of a mobile unit in the system of FIG. 1.

If, at the end of transmission #2 and during the subsequent TOT 48, mobile unit 32 wishes to reply to mobile unit 30, he will depress his PTT, send an ISW 50, receive an OSW 52, and begin transmitting on the same assigned channel. The transmission by mobile unit 32 is indicated as transmission #3, followed by a TOT 54. If, then, mobile unit 36 also wishes to contribute to the conversation, but does not depress his PTT during the TOT period 54, his unit will send an ISW 56 and receive an OSW 58 but it will not necessarily be assigned the same channel as before. The other units of the group, however, having returned to the control channel, will be instructed by the OSW 58 to listen on whatever channel was newly assigned in that channel grant. The conversation between members of this group, then, can continue on the same channel as long as requests are made each time within the TOT period which is not difficult to do. This avoids the possibility that no channel might be available when the next unit asserts PTT for a channel request FIG. 3 is a flow chart comparing the operation of a system including "transmission trunked" fleets, "message trunked" fleets and fleets including the automatic "wireline unit ID processing" of the present invention. It is to be noted that certain other "handshake" detections and acknowledgments may be utilized, such as are known in the art, but these are omitted from the description as not significant to this invention.

The chart begins with a mobile unit listening on a voice channel. The operator wishes to transmit, so depresses his PTT switch. If his unit is part of a "transmission trunked" fleet, it must remain on the voice channel until a "disconnect" signal is detected, then his unit will return to the control channel and his voice channel request will be sent on the control channel. Assuming that his request is honored by a channel grant, he can then transmit. If his fleet is not transmission trunked, and does not have wireline unit ID processing, it simply transmits on the voice channel it was listening on.

With the addition of wireline unit ID processing, the mobile unit will start its PTT ID timer, return to the control channel and send in an ISW requesting a voice channel assignment. It then listens on the control channel for an OSW which includes its own ID. Upon detecting and decoding the OSW, it checks to see if the voice channel assigned is the same as that previously assigned. If not, or if the PTT-ID timer has expired, the unit moves to the new channel and begins the transmit confirmation sequence. If the same channel had been assigned, and the PTT ID timer had not expired, the unit will return to that channel and begin to transmit. During the PTT timed period certain other channel confirmation procedures are not required.

Figure 4:
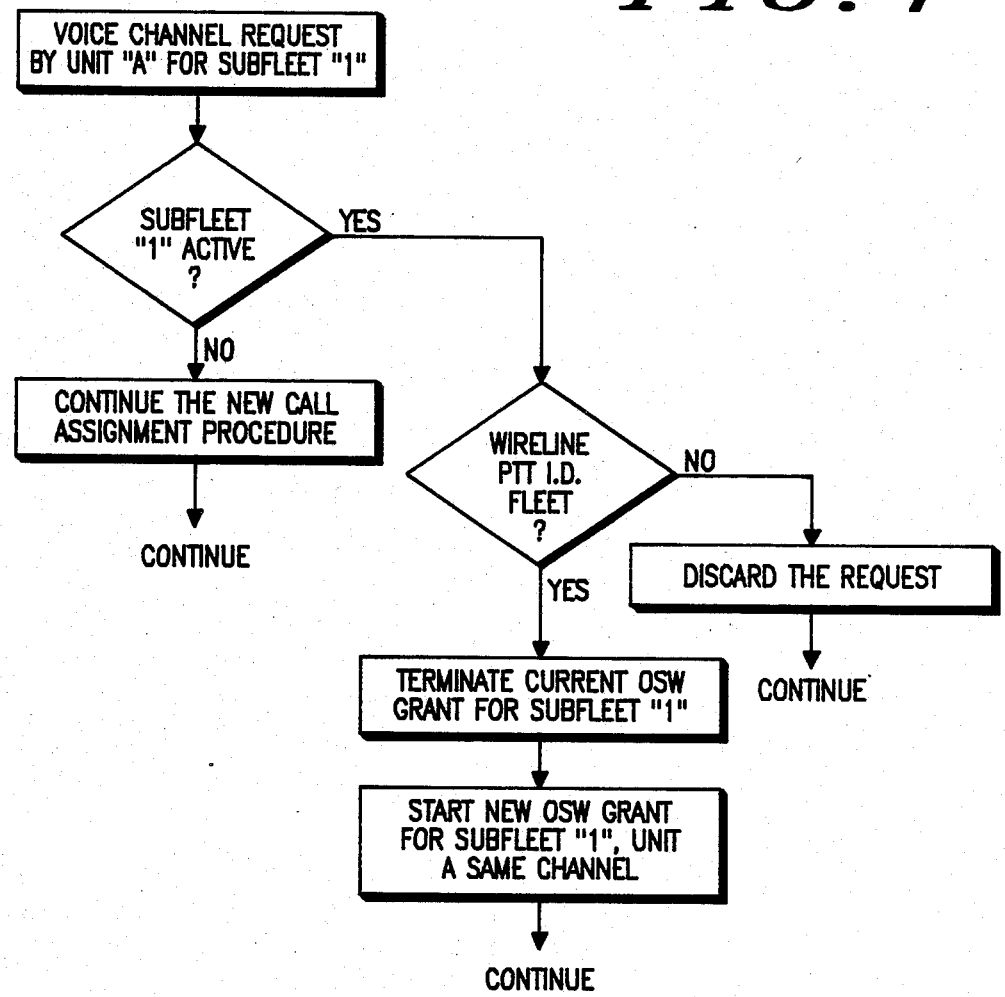
FIG. 4 is a flow chart of the control operation of the central control station in the system of FIG. 1.

FIG. 4 is a flowchart comparing the central controller operation in the case of a subfleet call for a channel grant for the same three types of units as in FIG. 3. If a voice channel request is received from a unit "A" wishing to call "subfleet 1", the central controller checks to see if that subfleet if already active. If it is not active, the "new call" assignment procedure is carried out. If, however, subfleet 1 is busy, the controller must determine if that subfleet uses wireline unit ID processing and, if not, the request is simply ignored. In the case of wireline unit ID processing, the current channel grant will be terminated, and a new channel grant for the same channel will be made for subfleet 1 and including unit A's ID. Thus, the identity of the new requesting unit is known for the records.

Dual word ISW's and OSW's have been disclosed in a co-pending application Ser. No. 687,810 for use in making private individual calls between any two units in a trunked system. In the present arrangement, similar dual word ISW's and OSW's are used to set up a temporary "patch" call, coupling together one subfleet with others on a single channel whether in the same fleet or not.

Figure 5A:
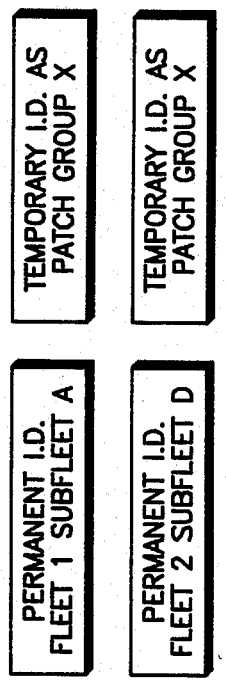
FIGS. 5a, b, c are diagrams of control channel transmissions in the system.

FIGS. 5a, b, c show the general formats of the "patch" commands, a dual ISW, and a corresponding dual OSW such as would be used in a patch call. The dispatcher, having made a decision to combine certain subfleets, initiates the forming of the temporary "patch" group and through the central controller the combined group is assigned a temporary "patch" ID. As seen in FIG. 5a, two commands are transmitted, each informing one of the groups of its new, temporary "identity". The first word of each dual command will include the permanent fleet and subfleet ID's of that group, and the second word will include the newly assigned patch ID. These commands effectively say to each group, "You and some other group of units will temporarily be known as 'patch group X' and will respond only to that ID" (for group calls).

Figure 5B:
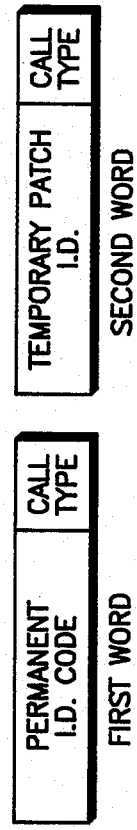
Figure 5C:
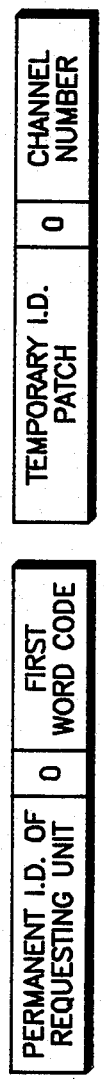

FIG. 5b is an ISW such as would be sent out by any unit of the temporary group requesting a channel. The first word of the ISW includes the permanent ID of the requesting unit and the call type code. The second word includes the newly assigned temporary ID of the patch group "X" plus a call type code. In FIG. 5c, the first word of the channel grant OSW includes the permanent ID of the requesting unit and a code signifying "first word", while the second word includes the temporary ID for "patch group X" and the assigned channel number. All units of patch group X will then switch to the assigned channel except as noted below. The logging device in the central console or external logging device will keep track of which unit initiated the request and which groups are involved in the patch call.

If one of the groups in the new patch group had been active on a voice channel at the time the new group was formed, a second voice channel would be assigned to the patch group, but the audio of the first group would be combined with the patch group audio at the console. This condition would continue until the first channel was released. On the other hand, if one or two units of the patch group were involved in a private call when the patch group was formed, they would be left out of the patch until the end of their conversation. As mentioned hereinabove, the OSW may be transmitted periodically during the grant period. Thus the unit(s) omitted from the patch group will detect the OSW and join the patch group automatically at the end of their original conversation.

It should be noted that the switching of channels and the transmission of ISW's and OSW's are done so automatically and essentially instantaneously that the users of the system are seldom if ever aware of their occurrence. It is also to be noted that the ISW/OSW data packets used herein may be encoded for error correction, detection, and packet sync as described in U.S. Pat. Nos. 3,882,457, 4,005,832, 4,271,520 and 4,312,070.

In the system described hereinabove, the use of a unit ID on every call is possible, thus allowing any unit to access the control channel to request a voice channel, with the identity of each requesting unit a matter of record. This is possible even with full duplex wireline control, where the dispatcher may be using a voice channel nearly continuously, and also possible even when the requesting unit is part of an active subfleet. With the use of the dual-word ISW's and OSW's, patch calls can be made between any desired configuration of fleets and subfleets with the identity of all requesting units and the called groups a matter of record.

I claim:

1. A two-way trunked communication system including a central control station and a plurality of remote units, each remote unit having a unique, permanent identification code (ID) for identifying the remote unit and at least one group to which it belongs, and comprising:

request making means in each remote unit for making a request on a first channel for the use of another channel and including in the request the ID of the requesting unit and the ID of the called unit or group, said request being made before each transmission on another channel;

first responding means in the control station for receiving said request and, if a channel is available, making a grant of the use of that channel, the grant being transmitted on the first channel and including the ID's of the requesting unit and the called unit or group, and the assigned channel information;

channel switching means in each remote unit for responding to said grant by switching to the granted channel;

timing means in the central control station for timing a predetermined period at the end of each transmission; and channel reserving means in the central control station for reserving said granted channel for the exclusive use of the requesting and called units during said timed period.

2. A system as in claim 1 wherein said central control station includes means for recording said ID's and the granted channel numbers for later reference.

3. A system as in claim 1 wherein said central control station and said remote units each include transmitting and receiving capabilities for transmitting and receiving both voice and data information signals.

4. A system as in claim 1 wherein said requesting unit includes decoding means for decoding received channel grants and enabling said channel switching means only when a decoded grant includes the permanent ID code of said unit.

5. A system as in claim 4 wherein said decoding means further includes memory means for storing the number of a just-used channel and comparing means for determining when the number of a newly granted channel is identical to the stored channel number.

6. A system as in claim 1 wherein said central control station includes means for forming a temporary group from all units of a plurality of groups of units and assigning one temporary ID to said temporary group.

7. A system as in claim 6 wherein a channel can be requested by and granted to any unit of said temporary group using said temporary group ID and said permanent ID of the requesting unit, and the channel switching means of each listening unit of the temporary group will switch that unit to the granted channel.

8. A remote unit as for use in a two-way trunked communication system including a central control station and a plurality of remote units, the central control station including means for receiving a channel request and, if a channel is available, making a grant of the use of that channel, the grant being transmitted on a first channel and including the ID's of the requesting unit and the called unit or group, and the assigned channel information, timing means for timing a predetermined period at the end of each transmission, and channel reserving means for reserving said granted channel for the exclusive use of the requesting and called units during said timed period; the remote unit comprising:

means for storing a unique, permanent identification code (ID) for identifying the remote unit and at least one group to which it belongs, request making means for making a request on the first channel for the use of another channel and including in the request the ID of the requesting unit and the ID of the called unit or group, said request being made on the first channel before each transmission on another channel;

channel switching means in each remote unit for responding to said grant by switching to the granted channel.

9. A remote unit as in claim 8 wherein said central control station and said remote units each include transmitting and receiving capabilities for transmitting and receiving both voice and data information signals.

10. A remote unit as in claim 8 and including decoding means for decoding received channel grants and enabling said channel switching means only when a decoded grant includes the permanent ID code of said unit.

11. A remote unit as in claim 10 wherein said decoding means further includes memory means for storing the number of a just-used channel and comparing means for determining when the number of a newly granted channel is identical to the stored channel number.

* * * * *